US010146567B2

(12) United States Patent
Sivak et al.

(10) Patent No.: US 10,146,567 B2
(45) Date of Patent: Dec. 4, 2018

(54) OPTIMIZING VIRTUAL MACHINE ALLOCATION TO CLUSTER HOSTS

(71) Applicant: Red Hat Israel, Ltd., Raanana (IL)

(72) Inventors: Martin Sivak, Brno (CZ); Doron Fediuck, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 377 days.

(21) Appl. No.: 14/548,514

(22) Filed: Nov. 20, 2014

(65) Prior Publication Data

US 2016/0147549 A1 May 26, 2016

(51) Int. Cl.
G06F 9/455 (2018.01)
(52) U.S. Cl.
CPC .. *G06F 9/45558* (2013.01); *G06F 2009/4557* (2013.01)
(58) Field of Classification Search
None
See application file for complete search history.

(56) References Cited

U.S. PATENT DOCUMENTS

| | | | |
|---|---|---|---|
| 6,374,297 B1 | 4/2002 | Wold et al. | |
| 8,037,180 B2 | 10/2011 | Smith et al. | |
| 8,037,280 B2 | 10/2011 | Pandey et al. | |
| 8,458,717 B1 | 6/2013 | Keagy et al. | |
| 2008/0229314 A1* | 9/2008 | Hirose | G06F 9/466 718/102 |
| 2011/0072138 A1 | 3/2011 | Canturk et al. | |
| 2012/0131577 A1* | 5/2012 | Arcese | G06F 8/60 718/1 |
| 2012/0151476 A1* | 6/2012 | Vincent | G06F 9/45558 718/1 |
| 2012/0192181 A1* | 7/2012 | Gilbert | G06F 9/45558 718/1 |
| 2013/0219364 A1 | 8/2013 | Falko | |
| 2014/0380308 A1* | 12/2014 | Hassine | G06F 9/45558 718/1 |

(Continued)

OTHER PUBLICATIONS

Omar Abdul-Rahman, "Live Migration-based Resource Mangers for Virtualized Environments", Jan. 2010, IARIA (Year: 2010).*

(Continued)

*Primary Examiner* — Wynuel S Aquino
(74) *Attorney, Agent, or Firm* — Lowenstein Sandler LLP

(57) ABSTRACT

Systems and methods for optimizing a virtual machine cluster. An example method may comprise receiving, by a processing device, an information characterizing a virtual machine cluster, the information comprising at least one of: values of one or more cluster configuration parameters, values of one or more cluster state parameters, or values of one or more user request parameters; and producing, in view of the received information, an ordered list of cluster configuration operations to be performed on virtual machines of the virtual machine cluster, the cluster configuration operations designed to yield a resulting configuration of the virtual machine cluster, wherein the resulting configuration is characterized by a quasi-optimal configuration score among configuration scores of two or more candidate configurations, the configuration score determined by applying one or more virtual machine scheduling policy rules to parameters of a candidate configuration.

20 Claims, 7 Drawing Sheets

(56) References Cited

U.S. PATENT DOCUMENTS

| | | | |
|---|---|---|---|
| 2015/0248305 A1* | 9/2015 | Shu | G06F 9/45558 718/1 |
| 2015/0378765 A1* | 12/2015 | Singh | G06F 9/45558 718/1 |
| 2016/0085573 A1* | 3/2016 | Anderson | G06F 9/45558 718/1 |

OTHER PUBLICATIONS

Gulati, Ajay, et al. "VMware Distributed Resource Management: Design, Implementation, and Lessons Learned", VMware, Inc., Facebook, Inc., 2012 pp. 45-64 https://labs.vmware.com/vmtj/vmware-distributed-resource-management-design-implementation-and-lessons-learned.

Marco, "VCAP5-DCA Objective 3.2—Optimize Virtual Machine Resources", Copyright 2009-2014, The Virtual World of Marc O'Polo, 90 pages https://blog.mrpol.nl/2012/12/07/vcap5-dca-objective-3-2-optimize-virtual-machine-resources/.

Maurer, Thomas, "How to Configure Availability Sets in Virtual Machine Manager", Jul. 18, 2013, 4 pages http://www.thomasmaurer.ch/2013/07/how-to-configure-availability-sets-in-virtual-machine-manager/.

"OptaPlanner User Guide", The OptaPlanner Team, jboss.org, Version 6.2.0 Final, 169 Pages http//docs.jboss.org/optaplanner/release/6.2.0.Final/optaplanner-docs/html_single/index.html (Last accessed Apr. 21, 2015).

"Chapter 5. The Rule Language", jboss.org, 62 pages https://docs.jboss.org/drools/release/5.2.0.Final/drools-expert-docs/html/ch05.html (Last accessed Apr. 21, 2015).

"Features/UI Plugins", www.ovirt.org, 18 pages http://www.ovirt.org/Features/UIPlugins (Last accessed Apr. 21, 2015).

* cited by examiner

SOLUTION STATUS
202

ⓘ Status: Solution is not doable! There are hard constraint violations.

⟳ Solution is being refreshed every 30 seconds.

▨ Freeze solution

VMS THAT SHOULD BE STARTED
204

| | | 212 | |
|---|---|---|---|
| test | ✗ Cancel | ⋀ up | |
| test-big | ✗ Cancel | ⋁ down | |

MIGRATION / START STEPS
206 test-big → host-two    ▶ start on host-two

TARGET STATE
208

| host | vm | memory [all in GB] | |
|---|---|---|---|
| | | used | available |
| host-one | | 1.0 | 1.9 |
| | ▢ test | 1.0 | 1.0 |
| host-two | | 0.6 | 1.9 |
| | ▢ test-big | 0.6 | 0.6 | ▶ start here |

SOLUTION STATUS — 202

ⓘ Status: Data received
↻ Solution is being refreshed every 30 seconds.

▒ Freeze solution

VMS THAT SHOULD BE STARTED — 204 test-big    ✖ Cancel    ∨ down

MIGRATION / START STEPS — 206 test2 → host-one      ▶▶ migrate to host-one
test-big → host-two   ▶ start on host-two

TARGET STATE — 208

| host | vm | memory [all in GB] | |
|---|---|---|---|
| | | used | available |
| 🖧 host-one | | 1.5 | 1.9 |
| | 🖵 test | 0.7 | 0.7 |
| | 🖵 test2 | 0.7 | 0.7 | ▶▶ migrate from host-two |
| 🖧 host-two | | 1.5 | 1.9 |
| | 🖵 test-big | 1.5 | 1.5 | ▶ start here |

FIG. 2D

OPTIMIZING VIRTUAL MACHINE ALLOCATION TO CLUSTER HOSTS

TECHNICAL FIELD

The present disclosure is generally related to virtualized computer systems, and is more specifically related to optimizing virtual machine allocation to cluster hosts.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 2A-2D schematically illustrate example screen shots 200A-200D for presenting solution information by virtualization manager 110, in accordance with one or more aspects of the present disclosure;

DETAILED DESCRIPTION

Described herein are methods and systems for optimizing virtual machine allocation to cluster hosts. "Cluster" herein shall refer to a logical grouping of hosts that share storage domains and have the same type of the central processing unit (CPU). Each cluster in a distributed computer system may be associated with a data center, and each host may be associated with a cluster. Virtual machines may be dynamically allocated to the cluster hosts and can be migrated between them, according to virtual machine scheduling policies that may specify load balancing across the hosts in a cluster, resource allocation rules, etc.

In accordance with one or more aspects of the present disclosure, a virtual machine scheduling service may query the virtualization manager service for information characterizing a virtual machine cluster. The information may comprise values of one or more cluster configuration parameters, values of one or more cluster state parameters, and values of one or more user request parameters. The cluster configuration parameters may be represented by one or more attributes of the hosts comprised by the virtual machine cluster and one or more attributes of virtual machines running on the hosts. The cluster state parameters may be represented by virtual machine status and performance metrics, including client accesses, memory accesses, network traffic, CPU usage, etc. The user request parameters may comprise parameters of virtual machine scheduling and configuration requests.

The cluster optimizing service may use the received cluster configuration, state, and user request information to produce an ordered list of cluster configuration operations (e.g., virtual machine migration operations or virtual machine start operations) to be performed on the virtual machines of the cluster, such that the sequence of the cluster configuration operations would yield a resulting configuration of the virtual machine cluster, which is characterized by a quasi-optimal configuration score. "Quasi-optimal configuration" herein shall refer to a configuration which has either globally optimal (maximal or minimal) configuration score among scores of all possible candidate configurations or locally optimal configuration score among scores of a certain set of candidate configurations. A configuration score may be determined by assessing the configuration compliance with a set of scheduling policy rules representing the configuration constraints.

Various aspects of the above referenced methods and systems are described in details herein below by way of examples, rather than by way of limitation.

Figure 1:
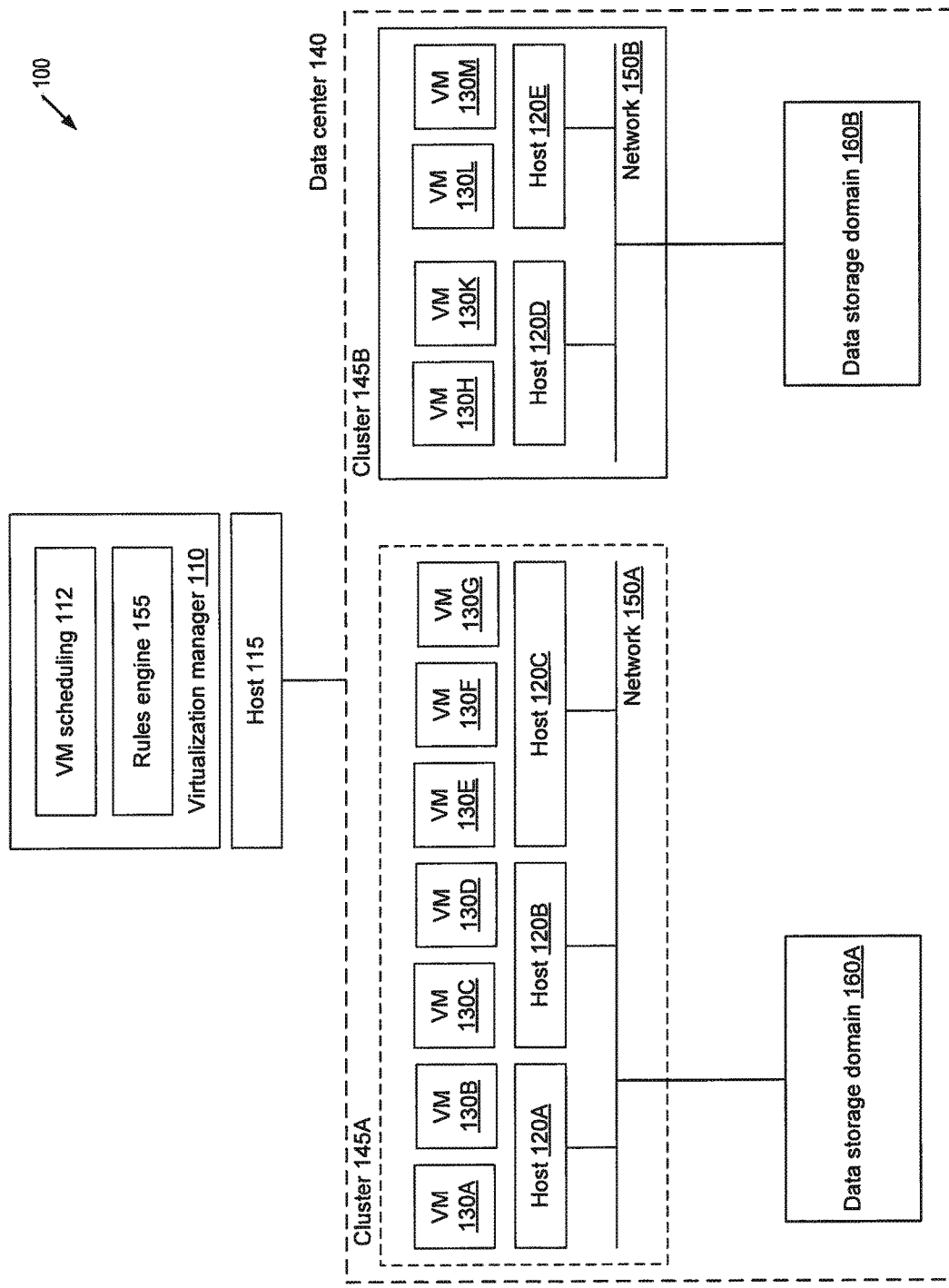
FIG. 1 depicts a high-level component diagram of one illustrative example of a distributed computer system 100 representing a virtualized environment operating in accordance with one or more aspects of the present disclosure.

FIG. 1 depicts a high-level component diagram of one illustrative example of a distributed computer system 100 representing a virtualized environment. In the illustrative example of FIG. 1, distributed computer system 100 comprises a virtualization manager 110 and a plurality of host computer systems 120A-120E grouped into one or more clusters 145A-145B associated with a data center 140 that represents the highest level of abstraction in the virtualization model.

Virtualization manager 110 may comprise one or more software modules being executed by a host computer system 115 for centralized management of the virtualized environment. Virtualization manager 110 may comprise various interfaces, including administrative interface, reporting interface, and/or application programming interface (API) to communicate to host computers 120A-120E of the managed virtualized environment, as well as to user portals, databases, directory servers and various other components which are omitted from FIG. 1 for clarity.

Each of host computer systems 115, 120A-120E may comprise one or more processing devices (CPUs) communicatively coupled to memory devices and input/output (I/O) devices, as described in more details herein below with references to FIG. 4.

Each of host computer systems 120A-120E may run a plurality of virtual machines 130A-130M, by executing a hypervisor to abstract the physical layer, including processors, memory, and I/O devices, and present this abstraction to the virtual machines as virtual devices. A virtual machine 130 may execute a guest operating system which may utilize the underlying virtual devices, including virtual processors, virtual memory, and virtual I/O devices. One or more applications may be running on virtual machine 130 under the guest operating system.

Host computer systems of each cluster 145 may be communicatively coupled, via a network 150, to one or more storage domains 160, including data storage domains 160A, 160B that store disk images of virtual machines 130.

In accordance with one or more aspects of the present disclosure, virtualization manager 110 may comprise a virtual machine scheduling module 112 for optimizing virtual machine allocation to cluster hosts, as described in more details herein below.

Virtual machine scheduling module 112 may query the virtualization manager service for information characterizing a virtual machine cluster. The information may comprise values of one or more cluster configuration parameters, values of one or more cluster state parameters, and values of one or more user request parameters. The cluster configuration parameters may be represented by one or more attributes of the hosts comprised by the virtual machine cluster and one or more attributes of virtual machines running on the hosts. The cluster state parameters may be represented by virtual machine status and performance metrics, including client accesses, memory accesses, network traffic, CPU usage, etc. The user request parameters may comprise parameters of virtual machine scheduling and configuration requests.

Host attributes may comprise the number and type of physical processors, random access memory (RAM) capacity, physical storage capacity, number and types of network interfaces, number of virtual machines currently executing on the host, and processor and memory usage by the virtual machines. Virtual machine attributes may comprise the number and type of virtual processors, virtual memory capacity, number and types of virtual network interfaces, an identifier of the operating system image, and an identifier of the host on which the virtual machine is currently running.

Virtual machine scheduling module 112 may be configured to convert the received cluster information into a set of statements (also referred to as "facts") describing the current state and configuration of the cluster, as well as pertinent user requests.

Virtualization manager 100 may further comprise a rules engine 155 which may be configured to store virtual machine scheduling rules. The scheduling rules may be represented by one or more modules comprising a plurality of statements in a certain rules language (e.g., Drools Rule Language, Business Rules Markup Language (BRML), etc.). In an illustrative example, a rule may comprise descriptions of one or more actions (also referred to right-hand side, RHS) responsive to determining that one or more conditions (also referred to left-hand side, LHS) are satisfied. A rule may also have additional attributes, such as a priority (rules with higher priority may be applied before rules with lower priority), agenda identifier (a form of rule grouping to ensure only rules in the agenda are allowed to execute), auto-focus (allowing a rule to execute despite not being grouped in an agenda group), activation group (an attribute to define whether a secondary rule is executed following the execution of a primary rule), no-loop flag (a setting to prevent iterative execution of the rule), etc. Rules engine 155 may be configured to match the facts describing the current state of the cluster to the LHS conditions defined by the rules. Responsive to determining that the LHS conditions defined by a rule are satisfied, rules engine 155 may perform one or more RHS actions defined by the rule.

Virtual machine scheduling module 112 may determine a configuration score by applying a set of constraints represented by the scheduling policy rules to parameters of the cluster configuration. Virtual machine scheduling module 112 may produce an ordered list of cluster configuration operations (e.g., virtual machine migration operations or virtual machine start operations) to be performed on the virtual machines of the cluster, such that the sequence of the cluster configuration operations would yield a resulting configuration of the virtual machine cluster, which is characterized by a quasi-optimal configuration score.

In certain implementations, the scheduling rules may represent one or more hard configuration constraints and one or more soft configuration constraints. A hard configuration constraint, by definition, may not be violated by the resulting cluster configuration, as well as by any intermediate cluster configuration. Examples of hard configuration constraints include such configuration parameters as CPU type, hypervisor type, etc. A soft configuration constraint, by definition, may be violated by the resulting cluster configuration, and such constrain violation may be reflected by the configuration score. In an illustrative example, an optimal (e.g., the maximal or minimal score among all possible candidate configurations) score may be associated with a cluster configuration satisfying all configuration constraints. Violating a soft constraint may be reflected by applying a penalty to the configuration score, i.e., the configuration score may be reduced or increased by a certain value corresponding to the soft constraint that is violated by the configuration. Thus, in certain implementations, the optimal resulting configuration may be defined as the configuration that satisfies all hard configuration constraints and violates the minimum number of the soft configuration constraints, as compared to at least of subset of possible candidate configurations.

Virtual machine scheduling module 112 may employ various optimization methods, including optimization methods that are known in the art, to produce a quasi-optimal cluster configuration, i.e., a configuration which has either globally optimal (maximal or minimal) configuration score among scores of all possible candidate configurations or locally optimal configuration score among scores of a certain set of candidate configurations. In an illustrative example, virtual machine scheduling module 112 may employ a simulating annealing method for optimizing the configuration score. In another illustrative example, virtual machine scheduling module 112 may iterate through at least a subset of all possible candidate configurations to determine the optimal configuration score. In yet another illustrative example, virtual machine scheduling module 112 may apply certain heuristic algorithms to generate the next candidate configuration that would be guaranteed to have the configuration score value that is closer to the optimal value than the current configuration score. In yet another illustrative example, virtual machine scheduling module 112 may accept or disregard a generated random candidate configuration based on the difference of the configuration scores of the current and candidate configurations.

In certain implementations, virtual machine scheduling module 112 may improve the efficiency of calculations by omitting soft constraints evaluation (i.e., only applying both hard constraints) for intermediate configurations. Virtual machine scheduling module 112 may apply both soft constraints and hard constraints to the resulting configuration only.

The solution may be represented by an ordered list of cluster configuration operations (e.g., virtual machine migration operations or virtual machine start operations) that may be performed on the virtual machines of the cluster to achieve the identified quasi-optimal cluster configuration. In certain implementations, the maximum number of cluster configuration operations that is permitted to achieve the identified quasi-optimal cluster configuration may be a configurable value.

In certain implementations, virtual machine scheduling module 112 may be invoked, periodically or in response to a certain event, to improve the current solution. In an illustrative example, virtual machine scheduling module 112 may be invoked in response to a cluster configuration change to improve the current solution in view of the new configuration information. In another illustrative example, virtual machine scheduling module 112 may query virtualization manager service 110 for the current cluster configuration information responsive to determining each cluster configuration operation of the ordered sequence of cluster configuration operations that are to be performed in order to achieve the identified quasi-optimal cluster configuration. In yet another illustrative example, virtual machine scheduling module 112 may query virtualization manager service 110 for the current cluster configuration information responsive to detecting that a certain period of time has elapsed since the previous configuration information update.

Figure 2A:
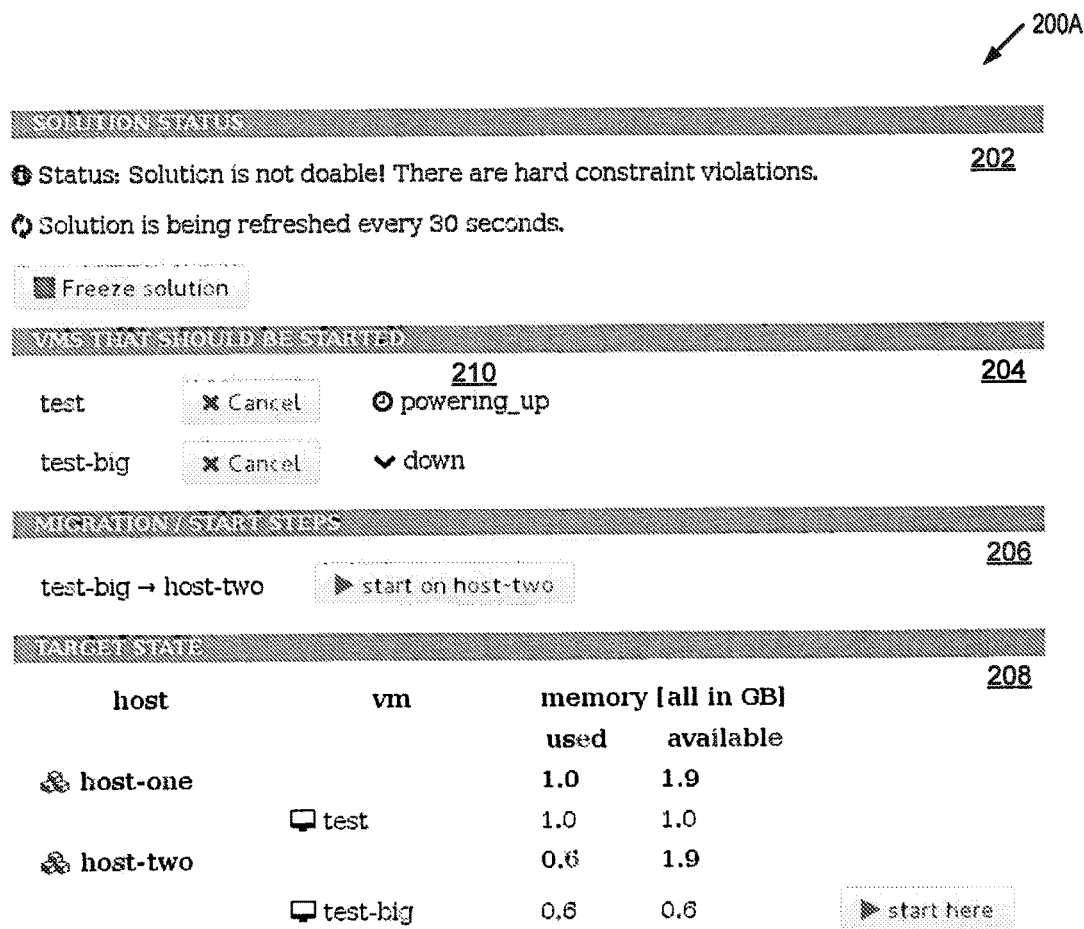

In certain implementations, virtualization manager 110 may be configured to present the identified solution via a graphical user interface (GUI). FIGS. 2A-2B schematically illustrate example screen shots 200A-200D for presenting solution information by virtualization manager 110, in accordance with one or more aspects of the present disclosure. As schematically illustrated by FIG. 2A, the GUI screen may comprise a solution status pane 202, a VM list pane 204, a migration sequence pane 206, and a target state pane 208. FIGS. 2A-2B schematically illustrate a startup event of the test virtual machine: responsive to receiving a user interface command confirming the virtual machine start, virtualization manager 110 may start the virtual machine, as reflected by the powering_up state indicator 210 in FIG. 2A. Responsive to successfully starting the virtual machine, virtualization manager 110 may update the virtual machine state indicator 212, as schematically illustrated by FIG. 2B.

In certain implementations, optimizing virtual machine allocation to cluster hosts by virtualization manager 110 in accordance with one or more aspects of the present disclosure allows starting virtual machines that cannot be scheduled directly based on the initial cluster configuration. In an illustrative example, in the current configuration no host may be able to accommodate a new virtual machine. However, by performing one or more virtual machine migration operations, certain virtual machines may be migrated from a target host to other hosts, thus allowing the new virtual machine to be scheduled on the target host.

Figure 2C:
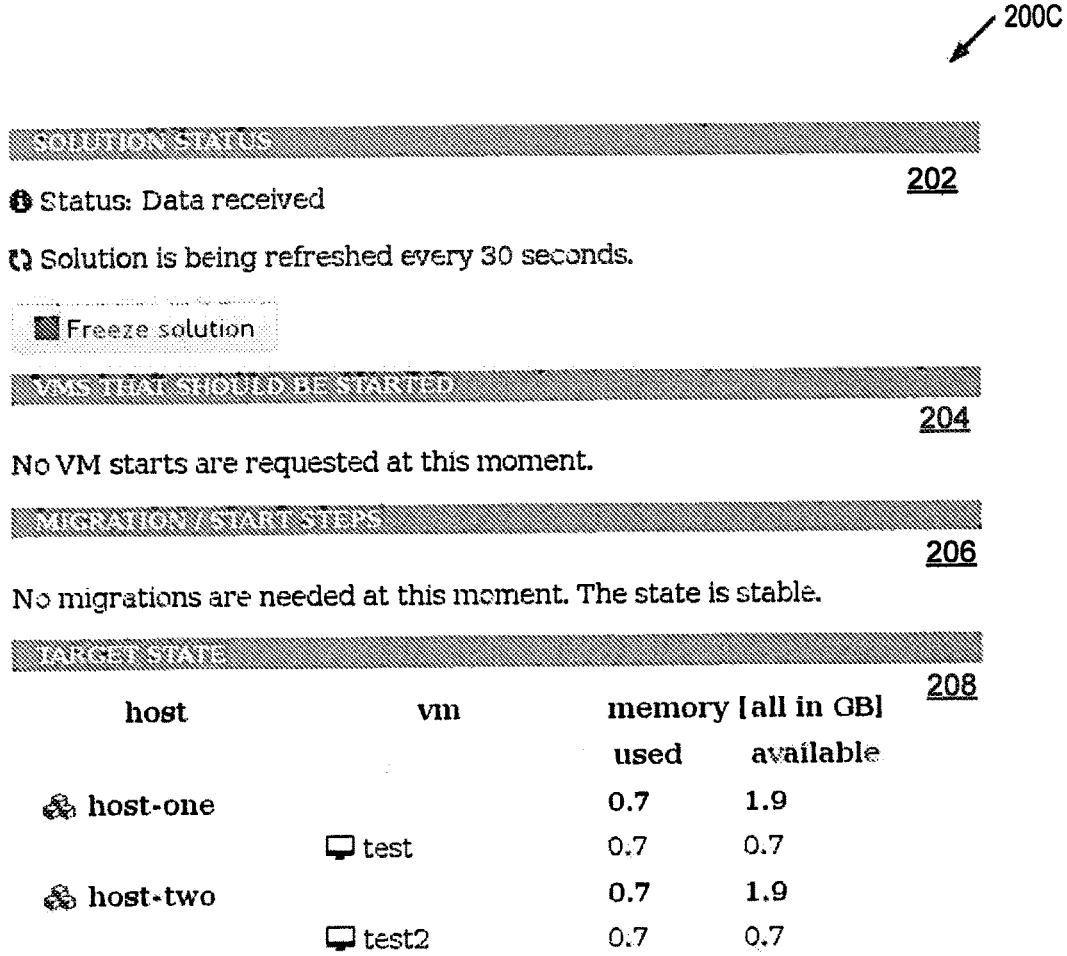

FIGS. 2C-2D schematically illustrate example screen shots 200A-200D for presenting another example solution information by virtualization manager 110, in accordance with one or more aspects of the present disclosure. As schematically illustrated by pane 208 of FIGS. 2C-2D, the test2 virtual machine was migrated from host-two host to host-one host in order to start the test-big virtual machine on host-two host.

Figure 3:
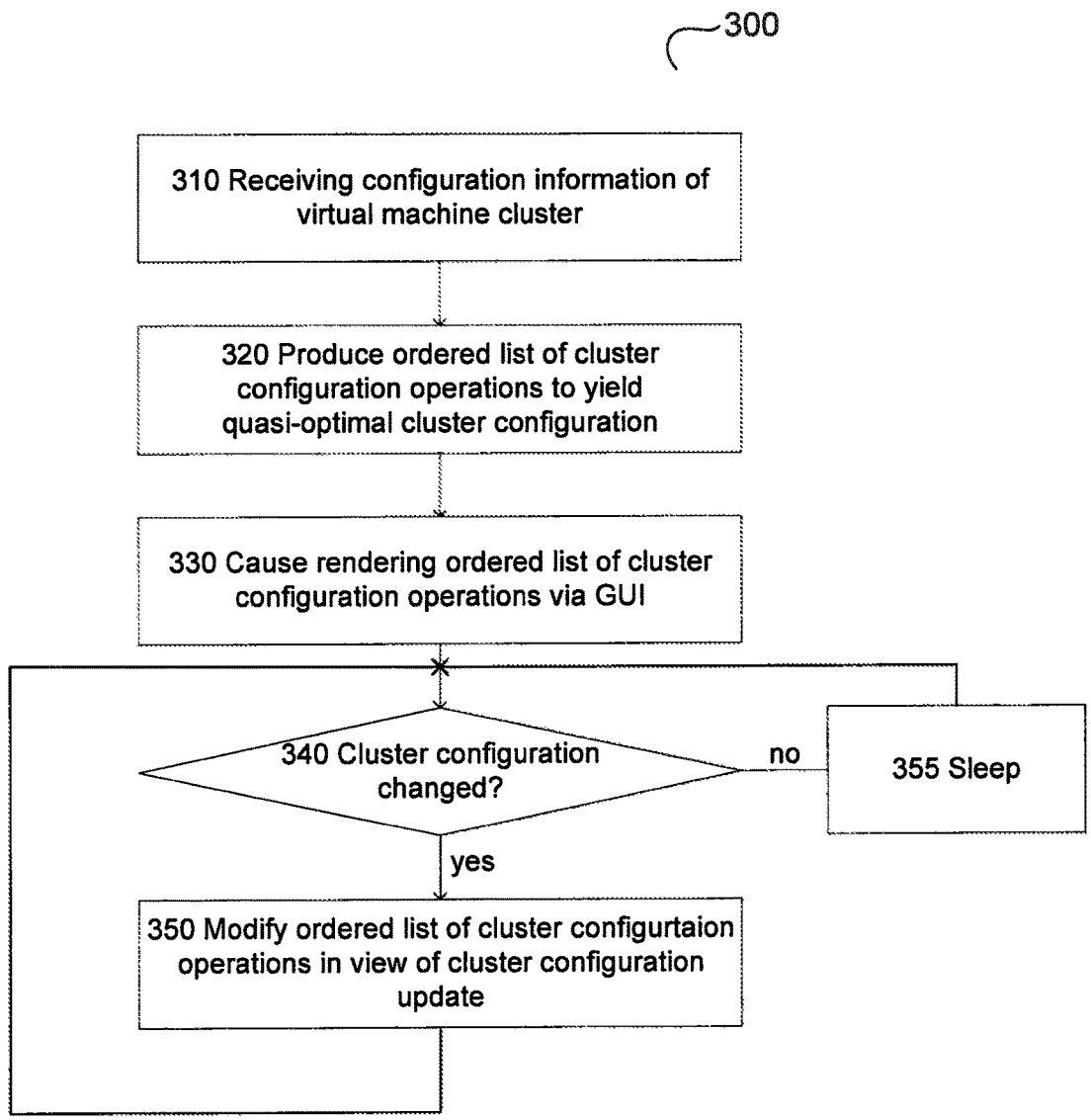
FIG. 3 depicts a flow diagram of a method for optimizing a virtual machine cluster, in accordance with one or more aspects of the present disclosure.

FIG. 3 depicts a flow diagram of one illustrative example of a method 300 for optimizing virtual machine allocation to cluster hosts, in accordance with one or more aspects of the present disclosure. Method 300 and/or each of its individual functions, routines, subroutines, or operations may be performed by one or more processing devices of the computer system (e.g., host computer system 115 of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the processing device implementing the method may query the virtualization manager service for the current cluster configuration information of a virtual machine cluster. In certain implementations, the configuration information may comprise values of one or more attributes of hosts comprised by the virtual machine cluster and/or values of one or more attributes of virtual machines running on the hosts, as described in more details herein above.

At block 320, the processing device may produce an ordered list of cluster configuration operations (e.g., virtual machine migration operations or virtual machine start operations) to be performed on the virtual machines of the cluster, such that the sequence of cluster configuration operations would yield a resulting configuration of the virtual machine cluster, which is characterized by a quasi-optimal configuration score. The configuration score may be determined by applying one or more virtual machine scheduling policy rules to parameters of the resulting configuration, as described in more details herein above.

At block 330, the processing device may present the identified solution comprising the ordered sequence of cluster configuration operations via a graphical user interface (GUI), as described in more details herein above.

Responsive to determining, at block 340, that the cluster configuration has been changed (e.g., by other virtual machine scheduling activities being performed upon the cluster), the processing device may, at block 350, modify the identified solution comprising the ordered sequence of cluster configuration operations in view of the cluster configuration update), as described in more details herein above. Alternatively, responsive to detecting that no configuration changes occurred, the processing thread may transition into an inactive (sleeping) state, as schematically indicated by block 355. Upon completing the operations referenced by block 330, the method may loop back to block 340.

Figure 4:
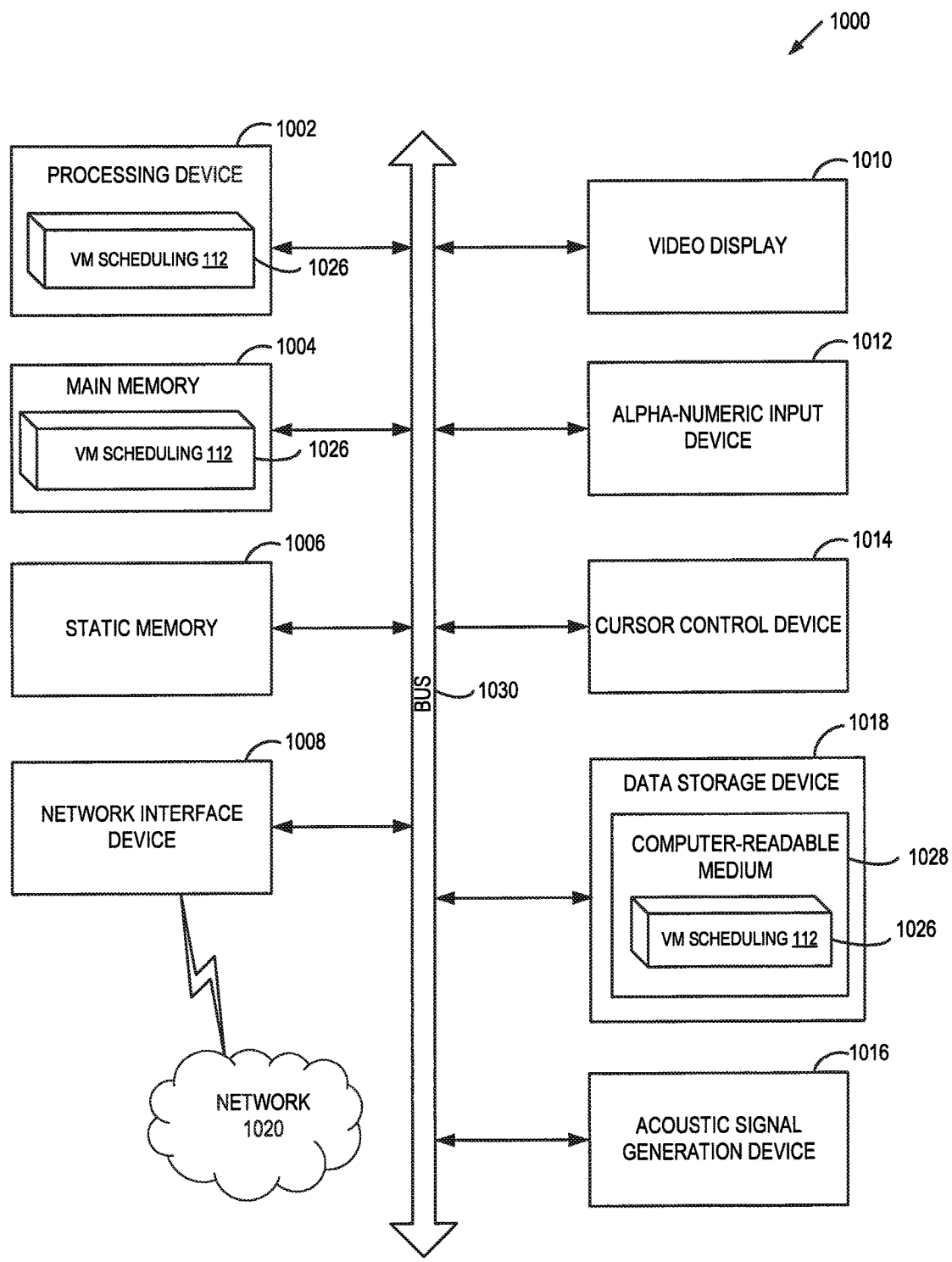
FIG. 4 schematically illustrates a component diagram of an example computer system which can perform any one or more of the methods described herein.

FIG. 4 schematically illustrates a component diagram of an example computer system 1000 which can perform any one or more of the methods described herein. In various illustrative examples, computer system 1000 may represent host computer systems 115, 120 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute virtual machine scheduling module 112 implementing method 300 for optimizing virtual machine allocation to cluster hosts.

Example computer system 1000 may further comprise a network interface device 1008, which may communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of resource allocation component, including method 300 for optimizing virtual machine allocation to cluster hosts.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
responsive to detecting a configuration change in a virtual machine cluster, querying a virtualization manager service to obtain configuration information of the virtual machine cluster;
receiving, by a processing device, the configuration information of the virtual machine cluster;
generating, in view of the configuration information, a plurality of candidate cluster configurations;
associating, by applying one or more virtual machine scheduling policy rules, a value of a configuration score with each candidate cluster configuration of the plurality of candidate cluster configurations, wherein the virtual machine scheduling policy rules specify at least one hard constraint which is not permitted to be violated and further specify at least one soft constraint which is permitted to be violated by cluster configurations;
producing an optimized configuration score by optimizing the configuration score using a simulation technique;
selecting, using the optimized configuration score, a resulting cluster configuration among the plurality of candidate cluster configurations, wherein the resulting cluster configuration satisfies the at least one hard configuration constraint and violates a minimum, among other candidate configurations, number of the soft configuration constraints;
producing an ordered list of cluster configuration operations to be performed on the virtual machine cluster in order to yield the resulting cluster configuration, wherein a number of the cluster configuration operations comprised by the ordered list does not exceed a specified threshold value; and
performing, on the virtual machine cluster, the cluster configuration operations defined by the ordered list, wherein the cluster configuration operations comprise migrating a virtual machine from the virtual machine cluster to another virtual machine cluster.

2. The method of claim 1, wherein the virtual machine cluster represents a logical group of hosts that share one or more storage domains and have a common type of a central processing unit (CPU).

3. The method of claim 1, wherein the cluster configuration parameters comprise at least one of: attributes of hosts comprised by the virtual machine cluster or attributes of virtual machines running on the hosts.

4. The method of claim 3, wherein the attributes of hosts comprise at least one of: a number of physical processors, a processor type, a random access memory (RAM) capacity, a storage capacity, a number of network interfaces, or a network interface type.

5. The method of claim 3, wherein the attributes of virtual machines comprise at least one of: a number of virtual processors, a processor type, a virtual memory capacity, a number of virtual network interfaces, a network interface type, or an identifier of an operating system image.

6. The method of claim 1, wherein the virtual machine scheduling policy rules comprise a plurality of statements encoded using a formal rules language.

7. The method of claim 1, wherein the virtual machine scheduling policy rules comprise a cluster load balancing rule.

8. The method of claim 1, wherein the virtual machine scheduling policy rules comprise a resource allocation rule.

9. The method of claim 1, wherein the optimal configuration score is represented by one of: a minimal configuration score or a maximal configuration score among configuration scores of the candidate configurations.

10. The method of claim 1, further comprising: modifying, by a certain value corresponding to a soft constraint that is violated by a candidate cluster configuration of the plurality of candidate cluster configurations, a configuration score associated with the candidate cluster configuration.

11. The method of claim 1, further comprising: modifying the ordered list of cluster configuration operations in view of a cluster configuration update.

12. The method of claim 1, further comprising: causing the ordered list of cluster configuration operations to be presented via a graphical user interface.

13. The system of claim 12, wherein the processing device is further to: modify the ordered list of cluster configuration operations in view of a cluster configuration update.

14. A system, comprising:
a memory; and
a processing device, operatively coupled to the memory, the processing device to:
responsive to detecting a configuration change in a virtual machine cluster, query a virtualization manager service to obtain configuration information of the virtual machine cluster;
receive the configuration information of the virtual machine cluster;
generate, in view of the configuration information, a plurality of candidate cluster configurations;
associate, by applying one or more virtual machine scheduling policy rules, a value of a configuration score with each candidate cluster configuration of the plurality of candidate cluster configurations, wherein the virtual machine scheduling policy rules specify at least one hard constraint which is not permitted to be violated and further specify at least one soft constraint which is permitted to be violated by cluster configurations;
producing an optimized configuration score by optimizing the configuration score using a simulation technique;
select, using the optimized configuration score, a resulting cluster configuration among the plurality of candidate cluster configurations, wherein the resulting cluster configuration satisfies the at least one hard configuration constraint and violates a minimum, among other candidate configurations, number of the soft configuration constraints;
produce an ordered list of cluster configuration operations to be performed on the virtual machine cluster in order to yield the resulting cluster configuration, wherein a number of the cluster configuration operations comprised by the ordered list does not exceed a specified threshold value; and
perform, on the virtual machine cluster, the cluster configuration operations defined by the ordered list, wherein the cluster configuration operations comprise migrating a virtual machine from the virtual machine cluster to another virtual machine cluster.

15. The system of claim 14, wherein the cluster configuration parameters comprise at least one of: attributes of hosts comprised by the virtual machine cluster or attributes of virtual machines running on the hosts.

16. The system of claim 14, wherein the attributes of virtual machines comprise at least one of: a number of virtual processors, a processor type, a virtual memory capacity, a number of virtual network interfaces, a network interface type, or an identifier of an operating system image.

17. The system of claim 14, wherein the processing device is further to:
cause the ordered list of cluster configuration operations to be presented via a graphical user interface.

18. A non-transitory computer-readable storage medium comprising executable instructions that, when executed by a processing device, cause the processing device to:
responsive to detecting a configuration change in a virtual machine cluster, query a virtualization manager service to obtain configuration information of the virtual machine cluster;
receive the configuration information of the virtual machine cluster;
generate, in view of the configuration information, a plurality of candidate cluster configurations;
associate, by applying one or more virtual machine scheduling policy rules, a value of a configuration score with each candidate cluster configuration of the plurality of candidate cluster configurations, wherein the virtual machine scheduling policy rules specify at least one hard constraint which is not permitted to be violated and further specify at least one soft constraint which is permitted to be violated by cluster configurations;
producing an optimized configuration score by optimizing the configuration score using a simulation technique;
select, using the optimized configuration score, a resulting cluster configuration among the plurality of candidate cluster configurations, wherein the resulting cluster configuration satisfies the at least one hard configuration constraints and violates a minimum, among other candidate configurations, number of the soft configuration constraints;
produce an ordered list of cluster configuration operations to be performed on the virtual machine cluster in order to yield the resulting cluster configuration, wherein a number of the cluster configuration operations comprised by the ordered list does not exceed a specified threshold value; and
performing, on the virtual machine cluster, the cluster configuration operations defined by the ordered list, wherein the cluster configuration operations comprise migrating a virtual machine from the virtual machine cluster to another virtual machine cluster.

19. The non-transitory computer-readable storage medium of claim 18, wherein the cluster configuration parameters comprise at least one of: attributes of hosts comprised by the virtual machine cluster or attributes of virtual machines running on the hosts.

20. The non-transitory computer-readable storage medium claim 18, wherein the attributes of virtual machines comprise at least one of: a number of virtual processors, a processor type, a virtual memory capacity, a number of virtual network interfaces, a network interface type, or an identifier of an operating system image.

* * * * *